US 8,214,792 B2

Jul. 3, 2012

(12) United States Patent
Antoun et al.

(10) Patent No.: US 8,214,792 B2
(45) Date of Patent: Jul. 3, 2012

(54) SYSTEM FOR IMPLEMENTING BUSINESS TRANSFORMATION IN AN ENTERPRISE

(75) Inventors: Samuel Antoun, Brunswick, OH (US); Graham Paul Bate, Gaithersburg, MD (US); Kishore Channabasavaiah, Palatine, IL (US); Shuvanker Ghosh, Tampa, FL (US); Edward H B Giesen, Bilthoven (NL); Thomas Franklin Guinan, Bethesda, MD (US); Raman Harishankar, Blacklick, OH (US); Kerrie Lamont Holley, Montara, CA (US); Joseph David Kramer, Passaic, NJ (US); Ying Tat Leung, Saratoga, CA (US); Kelly Anne Lyman, Greenbrae, CA (US); Jorge L. C. Sanz, Carmel, CA (US); Ignacio Gabriel Terrizzano, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 12/411,909

(22) Filed: Mar. 26, 2009

(65) Prior Publication Data

US 2010/0251205 A1 Sep. 30, 2010

(51) Int. Cl.
*G06F 9/44* (2006.01)
(52) U.S. Cl. ...................................... 717/100
(58) Field of Classification Search ........... 717/100–107
See application file for complete search history.

(56) References Cited

U.S. PATENT DOCUMENTS

| | | | |
|---|---|---|---|
| 5,745,878 A | 4/1998 | Hashimoto et al. | |
| 6,363,393 B1 | 3/2002 | Ribitzky | |
| 6,601,233 B1 | 7/2003 | Underwood | |
| 6,950,802 B1 | 9/2005 | Barnes et al. | |
| 7,703,071 B2 | 4/2010 | Kuester et al. | |
| 7,881,920 B2 | 2/2011 | Abu El Ata et al. | |
| 7,885,793 B2 | 2/2011 | Padmanabhan | |
| 2002/0091990 A1* | 7/2002 | Little et al. | 717/105 |
| 2002/0194053 A1 | 12/2002 | Barrett et al. | |
| 2005/0203784 A1 | 9/2005 | Rackham | |
| 2005/0246215 A1 | 11/2005 | Rackham | |
| 2006/0206870 A1* | 9/2006 | Moulden et al. | 717/124 |
| 2006/0235733 A1 | 10/2006 | Marks | |
| 2007/0021993 A1 | 1/2007 | Chandra et al. | |
| 2007/0027701 A1 | 2/2007 | Cohn et al. | |
| 2007/0038627 A1 | 2/2007 | Cohn et al. | |
| 2007/0050232 A1 | 3/2007 | Chang et al. | |
| 2007/0162482 A1 | 7/2007 | Flaxer et al. | |
| 2007/0174109 A1 | 7/2007 | Cohn et al. | |
| 2007/0196028 A1* | 8/2007 | Kokemohr et al. | 382/254 |
| 2008/0027784 A1 | 1/2008 | Ang et al. | |
| 2008/0126147 A1 | 5/2008 | Ang et al. | |
| 2008/0221940 A1 | 9/2008 | Cohn et al. | |

(Continued)

OTHER PUBLICATIONS

Vladimir Ergovic, "SOA From a Business Centric Perspective" Presented at the 2nd International Workshop on Service Oriented Software Engineering 2007, http://www.selab.isti.cnr.itllW-SOSWE07/index.html.

(Continued)

*Primary Examiner* — Anna Deng
(74) *Attorney, Agent, or Firm* — John R. Pivnichny

(57) ABSTRACT

A business enterprise is assessed by a consultant using a computer implemented tool for practicing component business modeling techniques. The tool builds a map of components, filters the map to form a heat map and identifies collaborations. Key performance indicators are evaluated.

4 Claims, 2 Drawing Sheets

U.S. PATENT DOCUMENTS

2008/0270201 A1    10/2008    Flaxer et al.
2009/0106300 A1*   4/2009     Brown .................. 707/102
2009/0106731 A1*   4/2009     Coulthard et al. ........ 717/101
2009/0192867 A1    7/2009     Farooq et al.
2010/0250300 A1    9/2010     Antoun et al.

OTHER PUBLICATIONS

IBM publication "Component Business Models, Making Specialization real" from the IBM Business Consulting Services, Copyright 2005.

Cherbakov, et al, "Impact of Service Orientation at the Business Level", IBM Systems Journal, vol. 44, No. 4, 2005, pp. 653-668.

Ferguson, et al, "Service-Oriented Architecture: Programming Model and Product Architecture", vol. 44, No. 4, 2005, pp. 753-780.

Ernest and Nisavic, "Adding Value to the IT Organization with the Component Business Model", IBM Systems Journal, vol. 36, No. 3, 2007, pp. 387-403.

Veryard, Richard, "The Component-Based Business", 2001, Plug and Play, Springer-Verlag, pp. 2-9, and 21-47.

Herzum and Sims, "Business Component Factory", Wiley & Sons, Inc., 2000, pp. 5-49, 61-64, 427-473.

Freeland, John, "The Ultimate CRM Strategies & Concepts for Building Enduring Customer Loyalty & Profitability", McGraw-Hill, 2003, pp. 3-9 and 13-17.

* cited by examiner

SYSTEM FOR IMPLEMENTING BUSINESS TRANSFORMATION IN AN ENTERPRISE

CROSS-REFERENCE TO RELATED APPLICATIONS

The present invention is related to application Ser. No. 12/411,781 filed Mar. 26, 2009 entitled, METHOD FOR TRANSFORMING AN ENTERPRISE BASED ON LINKAGES AMONG BUSINESS COMPONENTS, BUSINESS PROCESSES, AND SERVICES, which is incorporated herein by reference in its entirety.

The present invention is related to application Ser. No. 12/411,741 filed Mar. 26, 2009 entitled, BUSINESS ASSESSMENT METHOD, which is incorporated herein by reference in its entirety.

BACKGROUND OF THE INVENTION

1. Field of the Invention

The invention relates to tools for use in assessing a business enterprise. More specifically the tool is used for assessing and implementing a business transformation within the enterprise. Even more specifically, the transformation is implemented using service oriented architecture and component business modeling techniques.

2. Description of the Related Art

Component Business Modeling (CBM) techniques are described by Rackham is US 2005/0203784, filed Mar. 9, 2004, which is herein incorporated by reference in its entirety. Additional CBM techniques are described in US 2005/0246215, filed Jul. 8, 2005, US 2007/0027701, filed Jul. 15, 2005, US 2007/0021993, filed Jul. 23, 2005, US 2007/0038627, filed Aug. 12, 2005, US 2007/0050232, filed Aug. 26, 2005, US 2007/0162482, filed Jan. 10, 2006, US 2007/0174109, filed Mar. 8, 2007, and US 2008/0221940 filed Mar. 8, 2007.

Service Oriented Modeling and Architecture (SOMA) techniques are described by Ang et al in US 2008/0027784, filed Jul. 31, 2006, which is herein incorporated by reference in its entirety. Additional SOMA techniques are also described in US 2008/0126147, filed Jul. 31, 2006, and US 2008/0270201, filed Apr. 30, 2007.

Consulting work to perform assessments of a business enterprise for the purpose of implementing a transformation using the techniques of CBM and SOMA has become a significant effort by business services providing companies. It would therefore be a significant improvement in the art to have an assessment and implementation tool to facilitate such consulting work.

OBJECTS AND SUMMARY OF THE INVENTION

It is therefore a principal object of the invention to provide a computer implemented tool for performing a CBM or SOMA assessment of a business enterprise.

It is a further object of the invention to provide such a tool which supports a combined CBM/SOMA assessment and further may be used in implementing a service oriented architecture (SOA) solution based on the assessment.

These and other objects are attained in accordance with one embodiment of the invention in which there is provided a computer implemented tool for business transformation, comprising; a computer processor, a software development kit adapted for integrating and running plug-ins, the software development kit when launched on the computer processor presenting a user with an integrated development environment having a set of available plug-ins comprising, an activities view for editing activities associated with a component, a custom attributes view for editing customer attributes on a component or competency, a connections view for viewing collaboration in a CBM map, a heat map view for displaying host maps on a CBM map, a metrics view for editing KPIs, key performance indicator, on a component or a CBM map, a plug-in containing a core metamodel, and a plug-in for creating and specifying enterprise process scenarios.

DETAILED DESCRIPTION OF THE INVENTION

Figure 1:
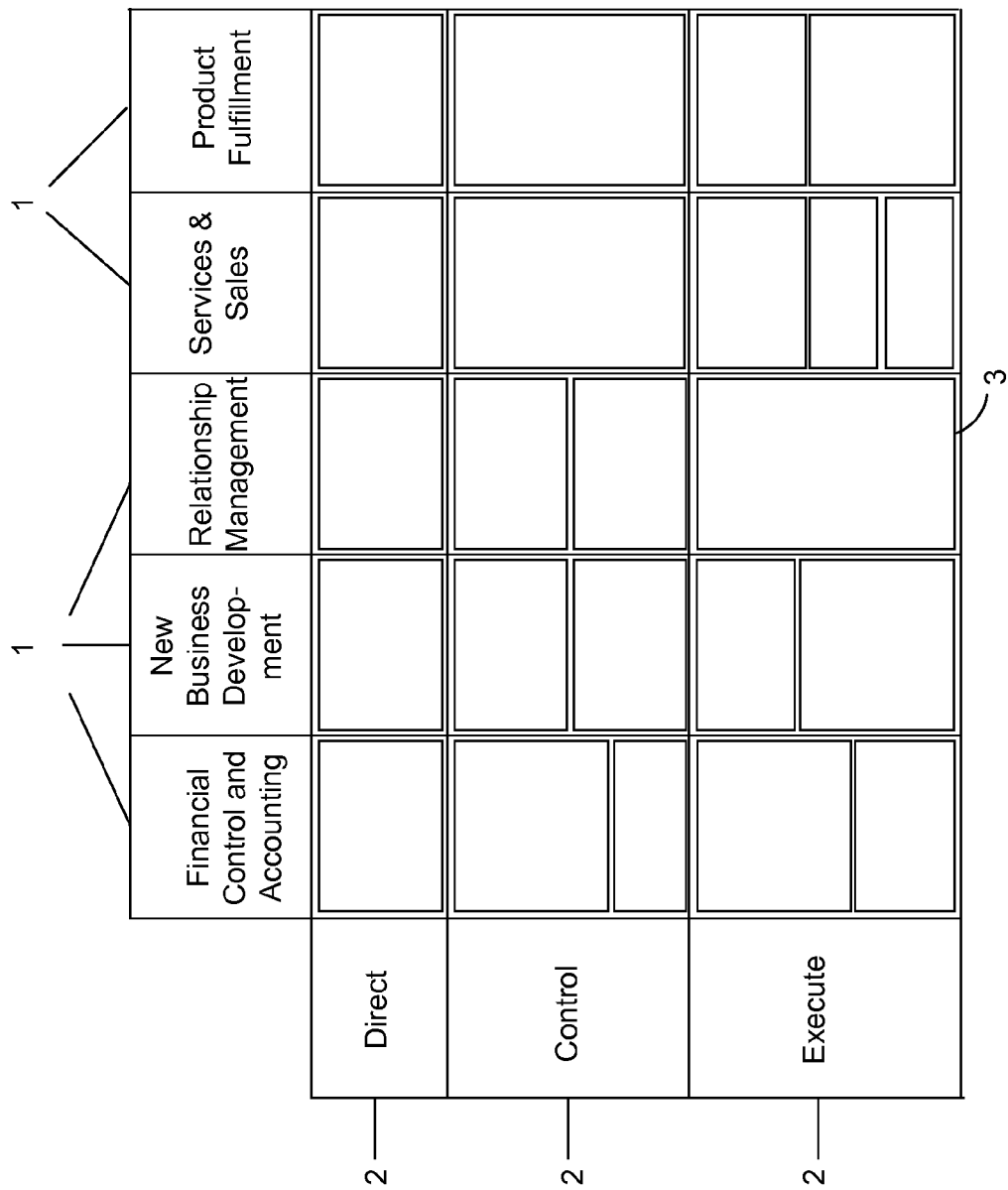
FIG. 1 is a simplified CBM map.

In FIG. 1, there is shown a simplified example of a typical CBM map. The columns 1 are business competencies which is defined herein to mean large business areas with characteristic skills and capabilities. For example, product development or supply chain would be business competencies. The rows 2 are accountability levels also called activity levels, which characterize the scope and intent of activity and decision making. There are three accountability levels. Direct, deals with strategy, overall direction, and policy. Control, deals with monitoring, managing exceptions, and tactical decision making. Execute, deals with doing the work. Each element, e.g. 3, within the map is a business component. For example, credit administration. A component is a part of the business enterprise that has the potential to operate independently. A business component could even be a separate company or a part of another company.

Construction and use of a CBM map is described by Rackham in US 2003/0203784. However, from the complexity involved, the computer implemented tool of the present invention is required to permit consultants to more easily practice the assessment steps needed in a business transformation. For example, a business component may contain several activities. Typically, a CBM map may have 300 to 700 activities in total, although actual situations vary from industry to industry, and enterprise to enterprise.

The term business service is used to mean some goods or services that a component offers to other components or external parties. Business services are the value provided by the components to the enterprise. In accomplishing this value, there are collaborations between components. These collaborations represent the needs of individual components to use business services from other components in the CBM map. Each of these collaborations is captured by the present invention tool as a relationship between business services existing between a given pair of components.

A key performance indicator (KPI) is a measurement for gauging the success or performance of a component. Examples of KPIs are profit, inventory turnover, and number of patents filed. A KPI may apply to more than one component. Furthermore, a KPI may have more than one comparison value. A KPI may be compared to an industry median value for that KPI.

Business components provide the capability using the present tool to easily observe the enterprise through a different number of lenses by simply changing the criteria by which components are evaluated, such as financial, strategic fit, organizational, or technical. A view is a graphical visualization of an evaluation of the components based on a simple criterion or attribute. Many views may be simultaneously visible, thus component evaluations based on several criteria can be observed. A view therefore is a graphical representation of a CBM map on which components are decorated (colored, shaded, or displaying an icon) to show the results of one or more evaluations. A consultant using the present invention tool needs to choose the appropriate evaluation criteria that defines the view, and thus, such a choice is critical to determine the actual outcome of this feature.

Attributes are properties within components. The value of an attribute may be mapped and displayed within a component in a custom attribute view. A plug-in of the present invention generates and displays this custom attributes view.

A heat map in the present invention tool is also a view to visualize a composition of views. The heat map is also used to identify hot components which by definition are candidates to analyze for opportunities for improvement and innovation, depending on the selected criteria.

The computer implemented tool of the present invention is constructed using a software development kit (SDK) adopted for integrating and running plug-ins. More specifically, the best mode comprises a series of plug-ins written in the Java programming language. These are modeled and persisted using the facilities of the Eclipse Modeling Framework (EMF). Eclipse is an open source platform available from International Business Machines Corporation of Armonk, N.Y., and other participating companies.

The Eclipse Modeling Framework SDK is a platform built on a mechanism for discovering, integrating, and running plug-ins. Each separate plug-in operates on files in a workspace and surfaces its specific user interface in a workbench. When the platform is launched, a user is presented with an integrated development environment (IDE) comprising the set of available plug-ins. The platform also provides useful building blocks and frameworks that facilitate the creation of new plug-ins.

Figure 2:
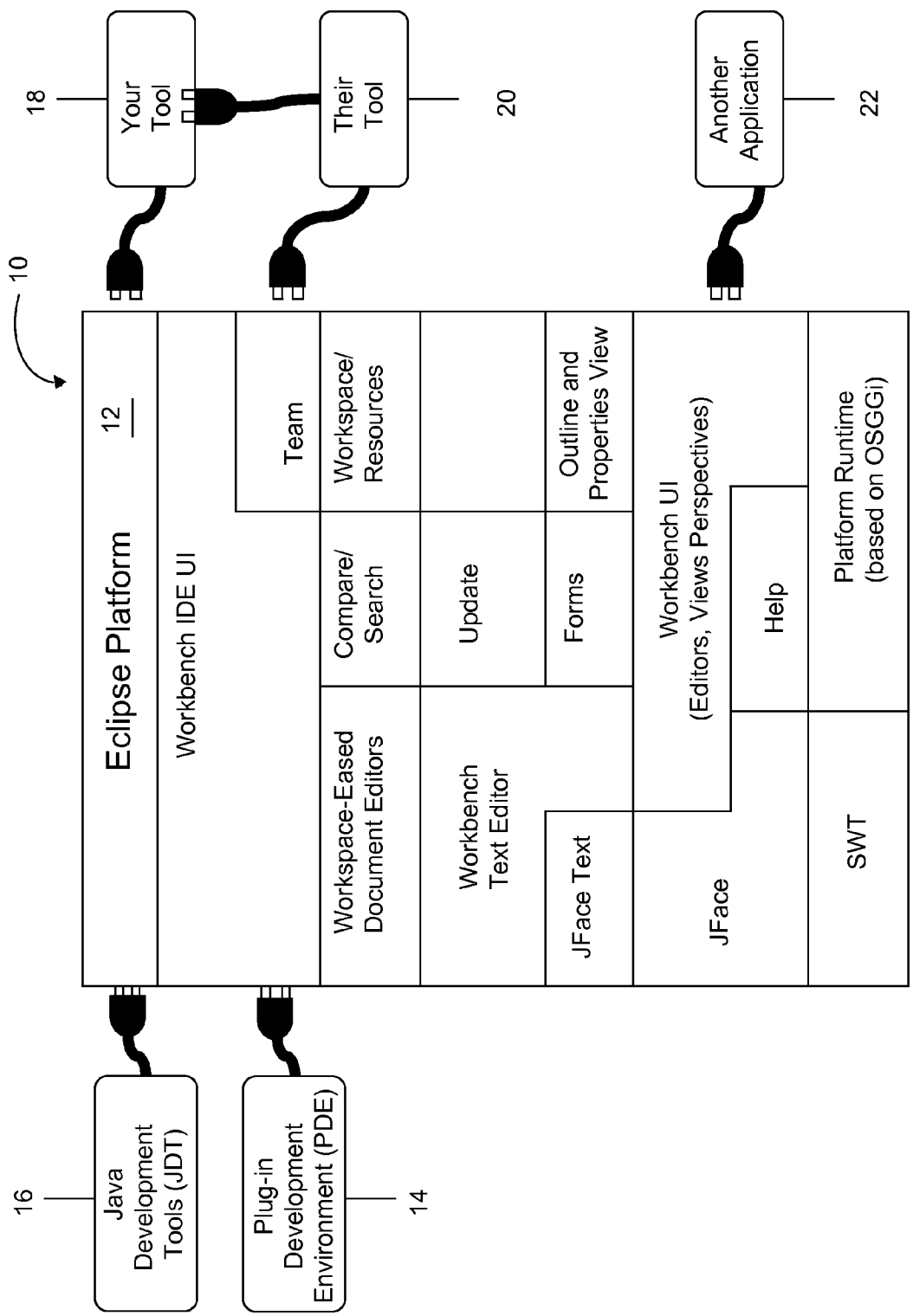
FIG. 2 depicts a software development list for integrating and running plug-in modules.

In FIG. 2, there is shown an example SDK 10 presenting an integrated development environment. The main platform 12 accepts user developed plug-ins 14, as well as Java development tools 16. The tool of the present invention 18 is presented with the set of available plug-ins 14, 16. Other tools 20 and even other applications 22 may simultaneously utilize main platform 12.

For the present invention, the plug-ins comprise an activities view, a customer attributes view, a connections view, a heat map view, a metrics view, core metamodel, and enterprises process scenarios plug-ins. These essential plug-ins permit the user to create CBM maps and perform assessments according to the CBM techniques.

Other optional plug-ins may also be present. For example, plug-ins for providing backward compatibility to previous file versions, exporting a CBM map to HTML, JPG, BMP, and presentation software graphics formats, exporting KPI's to a spreadsheet file, text searching capabilities, and presenting user interfaces.

While there have been shown and described what are at present considered the preferred embodiments of the invention, it will be obvious to those skilled in the art that various changes and modifications may be made therein without departing from the scope of the invention as defined by the appended claims.

What is claimed is:

1. A computer implemented tool for business transformation, comprising:
    a computer processor;
    a software development kit adapted for integrating and running plug-ins, said software development kit when launched on said computer processor presenting a user with an integrated development environment having a set of available plug-ins comprising:
    an activities view for editing activities associated with a component;
    a custom attributes view for editing customer attributes on the component;
    a connections view for viewing collaboration in a component business model (CBM) map;
    a heat map view for displaying host maps on the CBM map, wherein said heat map view is adapted to compute a composite component score for a component, $C_i$, according to the formula $$\mathrm{score}(C_i) = \frac{\sum_{i=1}^{n} w_i f(H_i, C_i)}{\sum_{i=1}^{n} w_i}$$

where $H_i$ is a view that participates in said heat map, $W_i$ is a weight associated with $H_i$, and $f:(H.\mathrm{times}.C) \rightarrow \{0, 1\}$ is the standardization function for the legend assigned to the component $C_i$ for view $H_i$;
    a metrics view for editing a key performance indicator (KPI), on the component or the CBM map, wherein said metrics view is adapted for comparing a KPI value to an industry median value for the KPI;
    a plug-in containing a core metamodel; and
    a plug-in for creating and specifying enterprise process scenarios.

2. The tool of claim 1, further comprising a plug-in for creating associations to components.

3. The tool of claim 1, wherein said metrics view is adapted to accept a comparison criterion from a consultant and present a view in response thereto.

4. The tool of claim 1, wherein said core metamodel comprises a data model and a view model.

* * * * *